United States Patent [19]
Henderson

[11] 3,780,364
[45] Dec. 18, 1973

[54] DUAL-TACH CAPSTAN SPEED CONTROL

[75] Inventor: Joseph D. Henderson, Tulsa, Okla.

[73] Assignee: Telex Computer Products, Inc., Tulsa, Okla.

[22] Filed: July 6, 1972

[21] Appl. No.: 269,511

[52] U.S. Cl.............. 318/271, 318/326, 318/391, 318/318
[51] Int. Cl. ............................................ H02p 5/16
[58] Field of Search ........... 318/326–328, 314, 318, 318/271, 391, 398; 307/233

[56] References Cited
UNITED STATES PATENTS

| | | | |
|---|---|---|---|
| 3,508,132 | 4/1970 | Peterson | 318/271 |
| 3,586,946 | 6/1971 | Sadashige | 318/398 |
| 3,593,075 | 7/1971 | Pantelakis | 318/391 |
| 3,559,018 | 1/1971 | Fournier | 318/314 |
| 3,591,858 | 7/1971 | Boyd | 307/233 |
| 3,626,204 | 12/1971 | Brandon | 307/233 |

Primary Examiner—Bernard A. Gilheany
Assistant Examiner—Thomas Langer
Attorney—James R. Head et al.

[57] ABSTRACT

This invention describes an improved system for controlling the speed of a capstan which drives magnetic tape in a tape handling system. A d.c. tachometer and a digital tachometer are driven by the capstan motor. A first servo takes as two inputs the output of the d.c. tachometer and a ramp voltage (either up or down) and controls the drive motor to follow the ramp voltage. An oscillator and a counter provide pulses at a preselected time interval and the digital tachometer provides pulses at a time interval dependent upon the speed of the drive motor. A second servo utilizes these two inputs to provide an output voltage which is a function of the difference between the periods of these two pulses and controls the speed of the drive motor in accordance with this difference voltage. Means are provided to apply the d.c. servo while the tape is being speeded up or slowed down or is stopped. While the tape is at running speed, it is controlled by the second servo.

8 Claims, 4 Drawing Figures

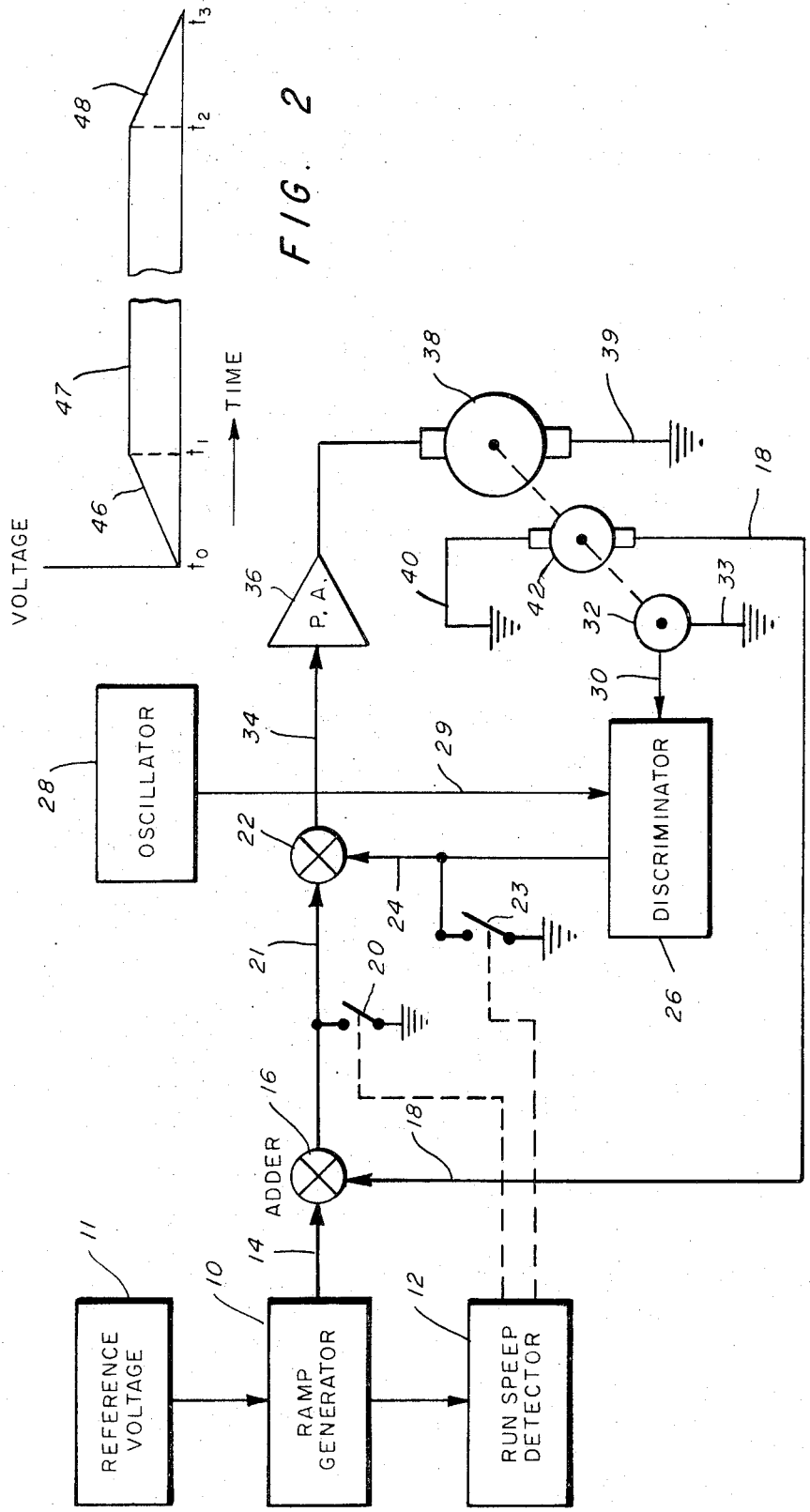

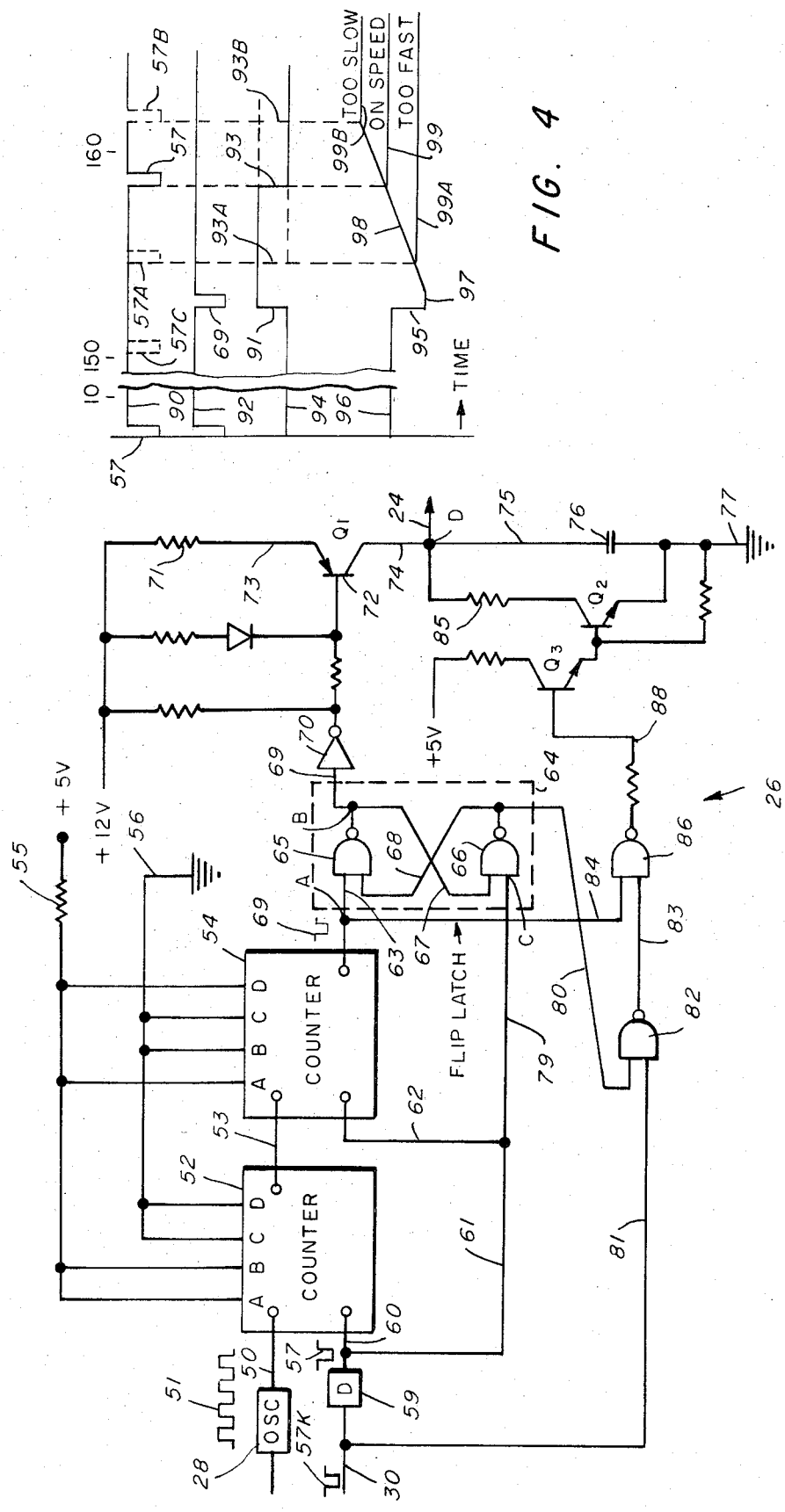

DUAL-TACH CAPSTAN SPEED CONTROL

BACKGROUND OF THE INVENTION

This invention is in the field of motor control systems. More particularly it is in the field of the speed control of a capstan for driving magnetic tape in a tape handling unit.

The prior art speed control circuits, for capstan drive motors used in digital tape systems, have all worked in much the same way. Typically, a d.c. tachometer is mechanically driven by the capstan motor which also drives the magnetic tape. The tachometer output voltage level and polarity are analogous to the angular velocity and direction of rotation of the drive motor. The tachometer output is compared to a reference voltage and the difference between the two is amplified and used to drive the motor in the direction that minimizes the difference. In this manner the motor is driven so that the d.c. tachometer is made to track the reference voltage.

To get tape up to speed and back to stop smoothly, a ramp generator is used in connection with the reference source. When a forward or backward command is received, a ramp voltage which rises in a specified length of time, then stays at a predetermined level, is fed to the servo. The motor speed increases uniformly until run speed is reached then stays constant until the motion command is removed. Speed then ramps uniformly down to stop.

There is one principal weakness of this type of speed control and that is the possible drift of the running speed due to drift of the output of the d.c. tachometer, or change in the reference source with time or temperature. This drift makes occasional speed adjustments in the field a necessity. Also the d.c. tachometer control has a relatively low voltage sensitivity and often is not precise enough to maintain a truly constant rate of drive of the tape.

In other prior art systems, the constant speed control of the capstan motor is effected by comparing the period of a constant frequency oscillator and the period between pulses of a digital tachometer driven by the capstan motor. When the digital tachometer period is the longer of the two, a switch is closed to apply power to the motor. When the tachometer period is the shorter, the switch is opened and the motor slows down. By this so called "bang-bang" servo, where the control is either all on, or all off, the motor speed oscillates above and below the true speed, but is never controlled to precisely run at true speed. With this system, starting and stopping are difficult, especially if tape speed is slow and start and stop times are long.

SUMMARY OF THE INVENTION

This invention solves the problem of drift by adding a digital tachometer to the old d.c. tachometer system. The d.c. tachometer is still used to start and stop the motor with ramp voltages. However, when the motor is up to speed the d.c. tachometer servo loop is disabled and a second servo loop is closed around the drive motor. This utilizes the digital tachometer, and a digital discriminator to provide an output voltage which is analogous to the speed of the drive motor. This voltage is used to control the capstan speed to a constant value. Because the discriminator is digital and crystal controlled the drift in this servo is much lower than in the d.c. tachometer servo and speed accuracy is thereby assured.

The heart of the control system lies in the discriminator which controls tape speed by measuring the period of time between each pair of tachometer pulses and comparing these periods to a constant preselected period. The voltage applied to the motor is then increased or decreased so as to adjust the motor speed to bring this period to a desired preselected value. A tachometer pulse programs a counter and starts it counting. An overflow pulse is produced by the counter a short time before the next tachometer pulse is due. The overflow pulse sets a flip latch whose output turns on a constant current source. The overflow pulse also triggers a switch which short circuits a capacitor for a short period. The capacitor then starts to be charged by the current source. This charging continues until the next tachometer pulse, which flows shortly after the overflow pulse. This tachometer pulse resets the flip latch which stops the charging of the capacitor. The capacitor retains the charge it had when the flip latch was reset. The capstan motor is then driven by this voltage through a power amplifier, and turns at a speed which is a function of this capacitor voltage. If the capstan is turning too slow the flip latch will hold the current source on a little longer than normal and the capacitor will charge to a higher voltage. This will cause the capstan motor to speed up. If the capstan runs too fast, the capstan pulse will occur at an earlier time, the capacitor will be charged to some lower value, and this lower voltage will cause the motor to run slower. In this way the motor adjusts its speed until the timing between the capstan pulse and the overflow pulse of the counter are in proper balance.

BRIEF DESCRIPTION OF THE DRAWINGS

It is an object of this invention to provide a capstan motor drive control such that during the start up and stop of the tape the capstan motor is driven in accordance with a first servo which follows a ramp voltage and during the period that the motor is driven at substantially constant speed it is controlled by a second servo which utilizes a digital tachometer.

These and other objects of this invention and a better understanding of the principles and details of the invention will be evident from the following description taken in conjunction with the appended drawings, in which:

FIG. 1 represents a schematic diagram of the improved control system of this invention.

FIG. 2 illustrates the type of ramp voltage used for the d.c. tachometer and first servo.

FIG. 3 is a detailed drawing of the discriminator.

FIG. 4 represents the wave forms at various points in the discriminator circuit.

DESCRIPTION OF THE PREFERRED EMBODIMENT

Referring now tp the drawings, and in particular to FIGS. 1 and 2, numeral 10 indicates the ramp generator which, as illustrated in FIG. 2, provides a voltage as a function of time such as 46 and 48. A ramp of voltage 46 which starts at zero at time $t_0$ and at time $t_1$ reaches a voltage 47 corresponding to the running speed of the capstan drive motor. At some time later such as $t_2$ it is decided to stop the drive and the ramp voltage 48 is provided which decreases linearly from the value of the running voltage 47 down to zero at time $t_3$. A bipolar ramp can be provided if it is necessary to drive the motor in both directions. A reference voltage 11 is provided to ensure an accurate value for the running voltage 47 of the ramp generator. Numeral 38 indicates the capstan drive motor which is powered by the motor amplifier 36. This motor 38 drives a d.c. generator or tachometer 42 the output of which goes by way of lead 18 to an adder circuit 16. This adder circuit is conventional, and devices are available on the market which serve the purpose of adding two voltages coming by way of lines 14 and 18 to the two inputs of the adder, and providing a single output by lead 21. Lead 14 carries the ramp voltage 46 as illustrated in FIG. 2 and lead 18 carries the output voltage of the d.c. tachometer 42. The output of the adder 16 goes by way of lead 21 to a second adder 22 which goes by lead 34 to a servo amplifier 36, which powers the drive motor. When there is no signal on lead 24 the only voltage going to the amplifier 36 is the error or sum signal from adder 16, which controls the motor 38.

Also driven by the motor 38 is a digital tachometer 32. This may comprise a photoelectric pickup using a disc with slots or a photographic disc with radial lines, etc. or an electromagnetic pickup, all of which are well known in the art. The output of the tachometer 32 is a series of pulses on line 30, the period between which corresponds to the time for rotation of the motor shaft by a preselected angle. An oscillator 28, which can be a crystal controlled constant frequency oscillator, such as is well known in the art, provides a series of pulses of constant period to the discriminator. A counter in the discriminator which will be described in connection with FIG. 3 creates a delay of a given period of time. When the drive motor 38 is running at proper speed, the tachometer is designed to put out a series of pulses with a period slightly lower than the counter delay. If the period of the tachometer becomes longer, then the output voltage of the discriminator, which shows on lead 24, will be higher and therefore the motor will accept a higher voltage from the amplifier 36. On the other hand if the motor speeds up, the period between tachometer pulses will be shortened and the output voltage of the discriminator 24 will be lower and so a lower voltage will be available to drive the motor and it will tend to slow down. In this way it achieves a balance between the output pulses of the digital tachometer and the output pulses of the counter so that the voltage remains constant in relationship to these two pulses.

This digital type of system provides a drift-free type of control which is much more satisfactory and much more precise than that which is provided by the conventional type of d.c. tachometer in the prior art devices. However, because of the difficulty of starting and stopping smoothly with a digital tachometer system the simpler d.c. tachometer is used only during the ramp-up and ramp-down operations of the tape drive. To facilitate this, a run speed detector 12 is provided which monitors the voltage 46, 47, 48 of FIG. 2. When the voltage of the d.c. tachometer 42 comes to the proper run speed 47 it switches off the adder 16, and switches on the signal from the discriminator to the amplifier 36. This it does by alternately shorting one or the other inputs to the adder 22 on lines 21 and 24. There are shorting switches 20 and 23 which are controlled by the run speed detector. These are electronic switches of the transistor type so that they are rapid-acting and the power amplifier can be switched from the d.c. tachometer system to the digital tachometer system, or back.

FIG. 3 illustrates in some detail the circuit of the discriminator. This is the essential part of the digital servo which continuously compares the period between pulses of the digital tachometer 32 and the pulses from the oscillator 28. A counter 52, 54 is provided, which may, for example, consist of two four-bit counters 52 and 54. The pulses 51 from the oscillator 28 coming over lead 50 to the input of counters 52 are carried also by lead 53 to the input of the second counter 54. These counters 52 and 54 are preset by the leads 55 and 56 to the electrical power and to ground so that they will count a specific number of pulses, such as 157. When 157 pulses are counted, an overflow pulse 69 will appear at terminal A. This overflow pulse will correspond to a period of 157 microseconds when the oscillator 28 puts out one MHz square waves shown as 51. The dashed line 64 encloses what is called a "flip latch" which is a device which is well known and available on the market, which has two inputs and two outputs. One input A sets the latch and the second input C resets the latch. When the latch is set, a voltage appears on output B which serves to start the transistor Q1 to pass current from the twelve volt supply to charge the capacitor 76 at a constant rate, corresponding to the value of resistance 71. When the latch is set by the overflow pulse (shown as 69), this pulse 69 through line 84 to gate 86 and transistor Q3 causes transistor Q2 to carry current and to short circuit the capacitor 76, and discharge it through resistance 85. Thus, during the short time that the pulse 69 is present at A, the capacitor 76 is shorted. Though the transistor Q1 had been carrying constant current through resistance 71, this has gone by way of resistance 85 and transistor Q2 to ground 77. When the pulse 69 ends, Q2 opens and the charging current from Q1 then goes into the capacitor 76 and its voltage rises at a uniform rate with time.

The tachometer voltage 32 comes by way of lead 30 through delay element 59 and leads 60, 61 and 62 to reset the counters 52 and 54, and start them counting. At the same time this voltage on lead 30 goes by way of lead 61 and 79 to the flip latch terminal C, which serves to reset the flip latch, which turns off the transistor Q1 and stops the charging of the capacitor 76. Whatever voltage there is on the capacitor 76 at the time the flip latch is reset, its voltage remains constant at that value. As shown in FIG. 1 the capacitor voltage goes by way of lead 24 to the adder 22, to the power amplifier 36, to provide a voltage for the drive motor 38 which is proportional to the voltage on capacitor 76.

The sequence of operation of the elements of the discriminator can best be illustrated in FIG. 4. Here a series of time functions, or time traces, illustrate the voltage pulses appearing at various points in the discriminator circuit. Trace 90 represents a time trace of the output of the digital tachometer. There is an output pulse 57 occurring at zero time and again some time later. This same pulse 57 starts the counters counting and at some later time the overflow pulse 69 from the counter occurs. This is shown on trace 92. The design of the system is such that when the motor is running at true speed the output pulse 57 from the digital tachometer will occur a few microseconds after the overflow pulse 69. The trace 94 shows the current 91 which flows through the resistance 71, lead 73, and transistor Q1. It starts when the flip latch is set by the pulse 69 and ends at 93 when the digital tachometer pulse 57 arrives. Trace 96 represents the voltage across the capacitor 76. This goes on at some voltage 96 until the arrival of the overflow pulse 69, which short circuits the capacitor and drops the voltage down along 95 to the value 97, or zero volts, during the period that the pulse occurs. When the pulse 69 ends, the charging current 91 has been flowing and now starts the flow into the capacitor, causing the voltage of the capacitor to rise along a constant slope line 98. When the digital tachometer pulse 57 occurs this terminates the charging of the capacitor and the voltage 99 of the capacitor at that time remains on the capacitor. The voltage that drives the capstan motor through amplifier 36 is a function of this voltage 99. The value shown corresponds to the "on-speed" condition. When the speed is too high, as illustrated by the pulse 57A which corresponds to a shorter period, and a higher speed of motor rotation, the charging current of capacitor 76, which started at 91 and goes to zero at 93A only has an opportunity to charge the capacitor for a short interval and therefore the capacitor voltage 99A is less than the proper on-speed voltage 99. This reduces the output of the power amplifier 36 so that the voltage on the drive motor is less than normal, and it begins to slow down. This lengthens the period of the pulses and pulse 57A tends to move back towards 57. On the other hand, when the motor is too slow and the pulse corresponds to 57B there is a longer charging period, to the time 93B, and the capacitor voltage rises to a higher voltage 99B, which correspondingly provides a higher drive voltage to the motor, which tends to speed it up.

It is thus seen that during the short period between the setting of the flip latch by the overflow pulse 69 and the arrival of the tachometer pule 57 the capacitor voltage varies in accordance with the time difference between the occurrence of these two pulses, and this difference in voltage serves to adjust the drive voltage of the capstan motor toward the nominal, on-speed, value and to hold it there.

If the motor speed is too high and if the capstan pulse 57C should come in before the arrival of the overflow pulse 69, then there is no way of short circuiting the capacitor to cause it to recharge from zero voltage. In this case the lead 81, which comes from the output of the capstan generator, goes through gate 82 and serves to trip the gate 86 and short circuit the condenser. However, since the flip latch has not been turned on there will be no charging current so that the output voltage of the condenser is at its minimum and the capstan motor has a low voltage to drive it and it begins to slow down. It will continue to slow down until the pulse 57 comes in behind the overflow pulse 69. When the pulse 57 becomes very late, corresponding to a too-slow motor speed, this represents a still higher voltage. So there is no danger of the voltage speed becoming too fast or too slow and the servo will act to bring it into the proper range of speed. The pulse 57k always leads the pulse 57 due to the delay 59. When pulse 57 arrives after the overflow pulse 69, then the gate 82 is disabled by lead 80 from the flip latch.

There have been occasional digital servo systems used in the industry which are applied only to maintain a constant speed of drive of the capstan once it is up to speed. These are generally of the on-off or so-called "bang-bang" type. These are rather crude systems and do not maintain the voltage as precisely as the type of system in this invention. Thus the type of system just described will provide a constant speed drive of great precision during the running time and will still have, during the start and stop periods a ramp drive which will guarantee very constant speed up and slow down times which are an important factor in the efficient use of the magnetic tape and will permit minimization of the length of the tape gap.

While this invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a magnetic tape drive system including supply and take-up reels for storing said tape and control and drive means for said reels, and capstan means for driving said tape, the improvement in means for driving said capstan comprising:
   a. drive motor means for driving said capstan;
   b. d. c. tachometer means driven by said drive motor;
   c. digital tachometer means driven by said drive motor;
   d. ramp generator means;
   e. first servo means for controlling said drive motor in accordance with the sum of said ramp generator output and said d. c. tachometer output;
   f. second servo means responsive to the output of an oscillator means and the output of said digital generator means for controlling said drive motor; and
   g. means for switching said drive motor between said first and second servos.

2. The drive system as in claim 1 in which said means for switching connects said drive motor to said first servo while said tape is coming up to running speed or going down from running speed, and connects said drive motor to said second servo while said tape is at running speed.

3. The drive system as in claim 1 in which said means for switching connects said drive motor to only one servo at a time.

4. The drive system as in claim 3 including adding means, the first input of said adding means going to said first servo, the second input going to said second servo and means to alternately short-circuit one of said two inputs.

5. The drive system as in claim 1 in which said second servo means comprises:
   a. oscillator means;
   b. counter means responsive to said oscillator for providing an overflow pulse at a preselected number of pulses from said oscillator;
   c. digital tachometer means for providing a pulse for each selected angular rotation of said motor and means responsive to said digital tachometer pulse to reset and to start said counter;
   d. flip latch means responsive to counter overflow pulse to set said latch and to start the charging of said capacitor at a preselected rate, and means responsive to said overflow pulse to short circuit said capacitor;

e. means responsive to said digital tachometer pulse for resetting said flip latch and stopping the charging of said capacitor; and f. amplifier means for applying to said drive motor a voltage proportional to the voltage of said capacitor at the time of resetting of said flip latch.

6. The drive system as in claim 5 including a pretachometer pulse which leads in time the tachometer pulse by a selected time interval; shorting means responsive to said pretachometer pulse to short said capacitor; and means to disable said shorting means when said tachometer pulse occurs after said overflow pulse.

7. A constant speed magnetic tape drive system comprising:
   a. capstan means for driving said tape and capstan motor means to drive said capstan;
   b. digital tachometer means driven by said drive motor to provide tachometer pulses representing selected angular rotation of said motor;
   c. constant frequency oscillator means and counter means responsive to said oscillator, said counter present to provide an overflow pulse at a preselected number of counts, said counter means responsive to, and reset by, said tachometer pulses;
   d. flip latch means set by said overflow pulses and reset by said tachometer pulses;
   e. capacitor means, first means responsive to said flip latch to charge said capacitor with a constant current of selected value, second means responsive to said overflow pulse to short circuit said capacitor for the time duration of said overflow pulse; said charging of said capacitor terminated when said flip latch is reset; and
   f. means responsive to said capacitor voltage to power said drive motor at a voltage which is a function of said capacitor voltage.

8. The drive system as in claim 7 including a pretachometer pulse which leads said tachometer pulse by a selected time interval; shorting means responsive to said pretachometer pulse to short circuit said capacitor; and means to disable said shorting means when said tachometer pulse occurs after said overflow pulse.

* * * * *